United States Patent [19]

Mast

[11] 4,224,075

[45] Sep. 23, 1980

[54] MATERIAL FOR MAKING POURABLE AND PASTE-LIKE MATERIALS

[76] Inventor: Peter Mast, Ottenhofenerstr. 24, 7580 Bühl-Weitenung, Fed. Rep. of Germany

[21] Appl. No.: 2,006

[22] Filed: Jan. 9, 1979

Related U.S. Application Data

[63] Continuation-in-part of Ser. No. 852,681, Nov. 18, 1977, abandoned, which is a continuation-in-part of Ser. No. 691,977, Jun. 2, 1976, abandoned.

[30] Foreign Application Priority Data

Jun. 5, 1975 [DE] Fed. Rep. of Germany ....... 2524983

[51] Int. Cl.$^3$ ............................................ C04B 35/46
[52] U.S. Cl. ..................................................... 106/55
[58] Field of Search ................. 106/55, 73.3, 299, 300

[56] References Cited

U.S. PATENT DOCUMENTS

| 503,425 | 8/1893 | Kidwell | 106/55 |
| 1,567,445 | 12/1925 | Lubowsky | 106/55 |
| 1,578,900 | 3/1926 | Lubowsky | 106/55 |

*Primary Examiner*—James Poer
*Attorney, Agent, or Firm*—Becker & Becker, Inc.

[57] ABSTRACT

A material for making pourable compounds, compensating and smoothing-out substances, such as mastics, injection molding substances, and coatings, which includes a titanium oxide containing mineral sand having a granular size not exceeding 0.2 mm. The grains of the mineral sand have a smooth surface similar to the surface of polished pebble stone.

3 Claims, No Drawings

MATERIAL FOR MAKING POURABLE AND PASTE-LIKE MATERIALS

This is a continuation-in-part of patent application Ser. No. 852,681—Mast, filed Nov. 18, 1977 which was a continuation-in-part of original application Ser. No. 691,977—Mast filed June 2, 1976, both now abandoned.

The present invention relates to a material for making pourable compounds, compensating or smoothing out substances, such as fillers and mastics, injection molding masses and coating masses, comprising a binder and a mineral sand.

It is known to mix synthetic substances with fillers to improve their properties. Thus, it is also known to use a mineral sand filler. In this connection, however, certain drawbacks have to be put up with which consist primarily in that the synthetic material intermixed with mineral sand has the tendency, after hardening, to form tears which start at the sand grains. This drawback has limited the utilization of mineral sand as a filler because relative to the filler too much of the purpose obtainable by the addition of fillers could, if at all, be realized only incompletely. Similar conditions prevail with other binders. In each instance in particular the strength, but also the other properties, are harmfully affected by the addition of mineral sand which in most instances defeats the desired improvement.

It is, therefore an object of the present invention to avoid the drawbacks of the heretofore known mineral sands as fillers in connection with binders and to reduce the proportion of the binders to such an extent that the properties of the mineral sand will become effective.

This object and other objects and advantages of the invention will be realized according to the invention by using as mineral sand a titanium oxide containing mineral sand (Ilmenite), the granular size of which is at a maximum 0.2 mm while the grains have a smooth of polished pebble-shaped surface.

The advantage of the material according to the present invention is seen above all in the fact that considerably less binder has to be used to obtain a firm connection of the individual sand grains with each other. Due to their shape, the grains when deposited in form of a pile have a point contact at several areas. The spaces between the grains can then be filled with a volumetrically small proportion of the binder. Each grain will thus be surrounded over its major portion by binder material and will thereby be grasped or gripped. As a result thereof, a homogenous mass is obtained, and the multipoint contact of the grains brings about a high mechanical pressure resistance.

A further advantage consists in the considerable reduction in shrinkage resulting therefrom as compared to pure binders. Furthermore, the material produced therefrom has a high pressure resistance, a high wear resistance, a high corrosion resistance, a definable slideability and an improved heat conductivity over heretofore used masses of the type involved when employing pure binders.

In connection with solid binders, even a later chip removing deformation by means of conventional tools present no problems.

There will now be indicated some of the possibilities of using the compound or mass according to the invention.

When using synthetic resin as binder, the following fields of utilization may be mentioned:

In connection with the manufacturing of machinery, the mass or compound according to the invention may be used for driving or output coatings, for instance, for making brake linings or linings for clutches and couplings.

In the machine tool art, the mass or compound according to the invention may serve as starting material for plate guides and other guiding elements. Also for the manufacture of templets or similar models the use of the mass or compound according to the invention has proved very advantageous because the wear resistance of the new material is considerably higher than that of heretofore known materials of the type involved so that the templets or models will have a longer life.

When building models, the use of the new material is advantageous in particular in connection with prototypes and with zero series and models where the great economy of the material according to the invention represents a distinctive advantage.

In the casting technique, individual models or series of models can be produced from the mass according to the present invention for sand casting or ingot mold casting. Also for the production of cores, the substance or mass according to the invention has proved satisfactory.

The mass production of any desired elements cast in rubber or steel molds, for instance, for driving units and pump parts, is greatly simplified when using the mass according to the invention.

In clarification of filter plants and for the construction of pertaining devices and installations, the mass or substance according to the invention can advantageously be utilized in view of its improved strength and its better corrosion resistance.

A further important field of employment consists in the use of the substance according to the invention for coating different substrata because no collapsing areas can form due to a shrinkage of the substance. For this reason also a thick coat is possible as compensating mass in the conveying art and in the building of machinery.

The above fields of utilization are given merely as examples, and it is obvious that anybody skilled in the art will find more uses for the material according to the invention. At any rate, it has been found that the utilization of the material according to the present invention in various fields results in considerable advantages and improvements of the respsective article.

When utilizing synthetic resin as binder, a mixture of 5 parts mineral sand with 1 part binder has proved highly advantageous. With other binders and other types of synthetic material, the most favorable mixture can easily be found. The easy binding tendency of the mineral sand due to its grain shape will considerably reduce the proportion of the binder. In connection with the binding tendency and binding strength of the material as coating substance, there is also to be mentioned that the naturally occurring mineral sand contains a proportion of from 2 to 20% of natural grease. If this adhering ability should vary to an undue extent because of a difference in the naturally occurring mineral sand which is mined as Ilmenite, it is possible by the addition of a natural or synthetic grease to adjust the grease content to the desired optimum degree.

The essence of the present invention consists therein that a mineral sand is dephased or displaced upon a titanium dioxide basis of which the grains have the size and form specifically defined. The present invention accordingly is in the utilization of the mineral sand with a grain or kernel form which is smooth and round similar to that of pebble stones. Solely and exclusively from this smooth and round grain form there can be explained the advantages of the present invention when compared with utilization of a sand with a different grain form.

The method of making pourable and paste-like compounds includes the steps of intermixing in a vacuum a smooth-surface mineral sand containing titanium oxide with a solidifiable binder. The method includes using a resin as the binder and proportioning the ratio of mineral sand to binder at 5:1.

U.S. Pat. No. 1,567,445—Lubowsky is completely beside the point because in line 20 there is especially required that the discovered rutile is to be ground. With a grinding, however, there are obtained grains with points, teeth, corners and the like which, however, at no time would result in grains with a pebble stone form. The grains so utilized according to the U.S. patent must accordingly first be connected with each other through a sintering because a connection with known binding means would result in a bad hold-together of the mass because tears or cracks would begin from the teeth, points and the like of each grain. The mechanical holding-together of such a material accordingly is also bad.

The behavior of the natural and cyrstalline material, according to the U.S. Pat. No. 503,425—Kidwell, is exactly the same as with that of U.S. Pat. No. 1,567,445—Lubowsky. The advantages listed in lines 10-22 thereof may result, but conspicuously there is apparent that the mechanical strength is not listed therewith because this mechanical strength is not listed therewith because this mechanical strength was relatively bad because of the known jagged grain form.

In comparison with the present invention, there is used a grain form which equals that of pebble stones and which is more spherical. A high strength of the hard material is attained thereby so that the portion of binder can be considerably reduced. Such reduction in the portion of binding can be proven.

These advantages, however, can now be attained with every binding medium when sand is used with the spherical grain form. Consequently, there is naturally very difficult now to introduce examples of the binding means into the case since thereby a restriction could result which is not justified. Preferably, usable binding means are for example as follows:

Alkyd resin dissolved in Butanol or test benzine (turpentine substitute) or Xylol or Toluol or Butylglykol of which hardening occurs through vaporzing of the dissolving means;

the same resins without a dissolving means only with a hardener;

Epoxyde resins in a solution of test benzine (turpentine substitute), Xylol or Dipentine or without dissolving means with a hardener;

synthetic resin systems mixed or compounded with drying plant-like fatty acids (Sebacic acids) with an oil content of at least 49%;

every other synthetic resin which is obtained through polymerization as for example, Aminplaste, melamine resins, Phenoplaste, ion exchangers of inorganic or organic type, silicone;

dispersion of differing synthetic resins such as Acrylate-dispersion, Acrylate-Styrol-dispersion, plasticized homopolymeric vinyl acetate and also unplasticized, copolymer Vinyl-acetate-Ester, Terpolymer Vinyl-Acryl-Acid Ester and the like;

water glass.

It is apparent from the foregoing that basically every binding means can be used according to the invention whereby the selection depends upon the necessary characteristics such as adhesive force, viscosity, flame resistance and the like.

There is extremely important that the foregoing inter-relationships are made absolutely clear so that the features of the present invention are not restricted in any form whatever through listing of the binding means.

A similar situation is true with respect to the concept "natural or synthetic grease." Natural greases in the sense of the present invention are such greases which come from animal bodies and which occur mostly already from animal carcasses in natural mineral sand or which subsequently are added in the quantities noted in order to improve the characteristics especially during mixing of the sand with the binders. Belonging therewith for example, are additions of fatty acids with a defined oil content set forth in the foregoing table. These materials are set forth only as example uses but there is stressed that no restriction whatever is to occur hereby. Basically, also a considerable quantity of examples in the form of recipes can be set forth and incorporated herewith, but in view of the essence of the present invention mentioned previously, there does not seem to be any need for supplementing the disclosure with listing of examples which are believed to be beside the point and which do not involve the essence of the present invention itself.

The exclusivity of the smooth surface for mechanical strength is emphasized. The binder, grease and resin should not have the importance attributed thereto. The essential feature of the present invention is that the mineral kernels or grains are round and polished smooth. The mineral is found in nature and more particularly only in South Africa with this kernel or grain form. In other countries such a mineral may also be found but there the kernel or grain form is angular and full of corners and sharp edged representing the reason why the same cannot be used in the sense of the present invention.

Previously, this mineral was known only as described in U.S. Pat. No. 503,425—Kidwell. Mixtures could be produced with this mineral sand containing at most 40 parts of any binding means and 60 parts mineral sand. Such a mixture, however, was usable only in especially advantageous cases without having separation or cracking away again from a carrier of support or having tears or cracks show up with a larger block. For this reason, one was forced to work normally with a mixing ration of 60 parts binder and 40 parts mineral sand. With this mixture for example, there could be attained a layering of at most 2 mm thickness without separation or breaking off of the layer again already at the most nominal loading. If greater thicknesses were to be created, then one had to rely on the aid of either a glass floss or mixture with 70 parts binder and 30 parts mineral sand. Under these circumstances, it is inconsequential and without meaning which binding medium was used.

This is the result because the mineral kernel or grain itself is the cause for a layer produced therewith to separate so quickly again from the support or carrier under load. The mineral kernel or grain particularly has peaks and sharp edges which are effective as a wedge upon binding means subject to internal tension so that already a relatively nominal additional tention effective from the outside enlarges the tear or crack beginning at a peak or a sharp edge of the mineral kernel or grain. This tear or break continues so far until coming to the outer skin of the layering and runs still further between the layer and carrier which brings about the separation and breaking away of the layer from the carrier.

At this point the present invention takes effect. Completely regardless of which binding mean is used, entirely by way of the round and smooth kernel or grain of the mineral sand to be used in accordance with the present invention there can be no tears or cracks at all or even small tears or crack are precluded from this kernel or grain leading thereto that every layer including even thicker layers are more solid and bond more rigidly also upon the support or carrier.

This goes so far that there can still be used a mixture with which only 5 parts binding means are mixed with 95 parts mineral sand. Inspite of this extraordinarily nominal binding means portion, such mixture bonds so well upon a support or carrier that the layer does not separate or break away. With the normal and previously known kernel or grain of the mineral such a mixture may still be produceable but no longer is usable because already during drying of the binding means so many tears and breaking away would be encountered that this layer practically is not usable.

This aforementioned inventive mixture can also be worked as for instance concrete and this means casting molds or forms and the like can be undertaken. Accordingly, blocks or cast-offs are obtained which are very dense which can be worked and used further.

Normally, according to the present invention masses with 10–20 parts binding means and the remainder being mineral sand are worked. A mixture so composed could not be used any more at all with normal kernel or grain because one may readily obtain a layer which, however, tears off or breaks away already from the carrier or support because the tears or cracks proceed particularly from the sharp peaks and corners and edges of the normal kernel and such tears or cracks accordingly destroy the layering.

By way of the considerable greater portion of mineral sand with the inventive masses, naturally also the essentially better characteristics of the mineral sand are moved into the foreground. Especially the very good wear resistance and the good heat-damming or insulation of the mineral are characteristics accordingly coming to the foreground and being predominant with the finished mass. The always softer binder in itself only fills the intermediate spaces between the kernels or grains and accordingly can determine the characteristics of the finished mass as with the known masses with which the binder often amounts to more than half of the mass and for this reason transfers its characteristics to the mass whereby the characteristics of the minerals must move into the background.

There should be recognized from the foregoing that the improvement of the masses results entirely and solely as well as exclusively by way of the use of the kernel or grain with round and smooth form like gravel whereby it is completely immaterial with which materials the kernels or grains are bound respectively connected with each other. There is apparent from the foregoing that the present invention basically functions with every binding means and actually a restriction is brought about if particular binding means are identified and others are not identified or mentioned.

In order to confirm this fact, there could be produced or attempted to be produced comparative features of layers with normal kernels or grains and layers in accordance with the present invention. Recognizable therefrom would be the fact that at the peaks and edges and corners of the normal grain or kernel, the tensions are so great that a tear or crack begins at such location even is only nominal loading arises effective from the outside whereas the inventive layering such concentration of tension cannot arise so that no tears or cracks result leading to a better bonding of the kernels or grains among each other and upon the carrier or support. The masses according to the present invention are essentially better.

Possibly there is sufficient also to provide layered plate strips with which the layer masses are entirely identical with only a single exception, namely in one case a normal kernel or grain is used and in the other case, a mineral sand according to the invention is used with round smooth kernels or grains. By way of simple bending tests, there can then be determined how much better the mass bonds according to the present invention.

It is apparent from the material of the prior art that for over 70 years it is known only to use the known minerals like rutile or titanium dioxide or anatase (octahedrite) or Brookits etc. directly or in a ground condition. However, this means nothing other than that the previously known titanium minerals possessed kernels or granules with jagged upper surface or points (tips).

According to the present invention, there is to be used a titanium compound or composition of which the kernels or granules are formed smooth and in a manner of gravel. The use of such formed kernels or granules is clearly novel and with the use of this novel kernel or granule form there is achieved also a considerable technical advance, namely a surprisingly better strength or stability and firmness of the masses produced therewith.

The teaching of the present invention which concerns a homogeneous mass and the multi-point contact of the grains bringing about a high mechanical pressure resistance as specifically set forth. The homogeneous mass does not exist in nature itself but rather represents a composition in accordance with the teaching of the present invention.

The specific teaching of the present invention is to achieve a high mechanical pressure resistance by multi-point contacting of the grains of sand. At the same time the tears or cracks must be obviated.

A synergistic effect must also be considered additionally since because of the special form of the sand kernels or grains the packing density in the finished mass can be considerably increased which on the other hand leads thereto that the finished mass as to hardness, fire resistance and the like provided considerably better results than with previously known mineral sands occurring in nature. By adding a specially suited binding means in a minimum proportion there is obtained a mass having characteristics which go far beyond expectations and also beyond what an expert in the art would expect. This on the other hand leads to the situation that this finished mass can be used for purposes for which the previously known sand respectively finished masses could not be used. There has been found that the samples made in accordance with the teaching of the present invention are essentially better particularly as to the bonding capability and internal adherence which means that the mass in accordance with the teaching of the present invention bonds considerably better upon the base or underground and is not susceptible to tears or cracks. Both of these characteristics were not expected by the experts but rather were not forseeable at all.

Because of these characteristics of these inventive materials it is possible to increase considerably the proportion of the mineral sand in the finished mass which finally leads there to that the finished mass is harder, considerably more fire resistant and also having greater wear resistance.

In summary one reaches the result that the masses according to the invention, essentially higher mineral and sand parts can exist which provides the masses on the one hand with a better characteristic from the mineral characteristic and on the other hand still has better bonding capability upon the support or carrier or among each other.

It is, of course, to be understood that the present invention is by no means limited to the specific embodiment but also encompasses any modifications within the scope of the appended claims.

What is claimed is:

1. A homogeneous mass for making pourable and paste-like compounds consisting of a minimum of only 5 parts solidifiable binder and correspondingly up to 95% mineral sand, which includes the improvement in combination therewith comprising: a mineral sand containing titanium oxide, the grains of said mineral sand not exceeding a size of 0.2 millimeters and having exclusively a smooth surface for firm stable mechanical strength of masses produced and similar to that of pebble stones, the grains having multi-point contact with each other bringing about a high mechanical pressure resistance, said binder being specifically a synthetic resin.

2. A homogeneous mass in combination according to claim 1, in which said mineral sand is Ilmenite which includes from 2 to 20% of grease.

3. A homogeneous mass in combination according to claim 1, in which the ratio of mineral sand to said binder is 5:1.

* * * * *